United States Patent [19]

Brock-Fisher et al.

[11] Patent Number: 5,577,505
[45] Date of Patent: Nov. 26, 1996

[54] MEANS FOR INCREASING SENSITIVITY IN NON-LINEAR ULTRASOUND IMAGING SYSTEMS

[75] Inventors: George A. Brock-Fisher; Mckee D. Poland, both of Andover; Patrick G. Rafter, Woburn, all of Mass.

[73] Assignee: Hewlett-Packard Company, Palo Alto, Calif.

[21] Appl. No.: 597,697

[22] Filed: Feb. 6, 1996

[51] Int. Cl.⁶ .................................................. A61B 8/00
[52] U.S. Cl. .................................................. 128/662.02
[58] Field of Search ................... 128/660.01, 662.02; 424/9.1, 9.32, 9.321

[56] References Cited

U.S. PATENT DOCUMENTS 5,410,516  4/1995  Uhlendorf et al. ................... 367/7
5,456,257  10/1995  Johnson et al. ................... 128/662.02
5,482,046  1/1996  Deitrich ................... 128/662.02

OTHER PUBLICATIONS

"Ultrasonic Detection Of Resonant Cavitation Bubbles In A Flow Tube By Their Second–Harmonic Emissions", D. L. Miller; Ultrasonics, Sep. 1981; pp. 217–224.

*Primary Examiner*—George Manuel
*Attorney, Agent, or Firm*—Pamela Lau Kee

[57] ABSTRACT

An image with increased sensitivity to non-linear responses, particularly second harmonic responses, can be achieved by measuring the ultrasound response under multiple excitation levels. The responses gathered from the multiple excitation levels are gain corrected in an amount corresponding to the difference in excitation levels, then subtracted. Because of this subtraction, most of the linear response will be removed, and what remains corresponds to the non-linear response.

12 Claims, 2 Drawing Sheets

MEANS FOR INCREASING SENSITIVITY IN NON-LINEAR ULTRASOUND IMAGING SYSTEMS

FIELD OF THE INVENTION

This invention pertains to ultrasound imaging systems. In particular, this invention is directed towards increasing sensitivity in the detection of non-linear responses from ultrasonic backscatterers.

BACKGROUND OF THE INVENTION

Medical ultrasound imaging systems have been designed under the premise that the impinging ultrasonic energy produces a linear response. In order to be linear, a system must obey the following equation: IF $x1(t)$=a system input and $y1(t)$ is the corresponding output and $x2(t)$=a system input and $y2(t)$ is the corresponding output THEN $(a*x1(t)+b*x2(t))$ as an input gives $(a*y1(t)$ and $b*y2(t))$ as an output Current trends in research concentrate on investigating non-linear responses to ultrasonic energy. For example, some contrast agents have been found to provide a second harmonic response to impinging ultrasound energy, and this response can be used to provide increased diagnostic information about the surrounding tissues. A second harmonic response occurs when an agent under increasing ultrasonic pressure, "maps" energy into its harmonics, instead of the fundamental.

In one prior art diagnostic system, disclosed by Johnson, et al in U.S. Pat. No. 5,456,257, the presence of coated microbubble contrast agents in the body of a patient is detected by transmitting ultrasonic energy which causes the destruction of the microbubble. The diagnostic system detects the microbubble destruction through phase insensitive detection and differentiation of echoes received from two consecutive ultrasonics transmission. The destruction of a microbubble may also be used as a point source of acoustic energy for aberration correction, whereby the timing of the beamformer is adjusted from an analysis of beamformer signals resulting from a detected microbubble destruction event.

It would be desirable to be able to enhance the detection of microbubbles in the bloodstream relative to the tissue.

SUMMARY OF THE INVENTION

An image with increased sensitivity to non-linear responses (e.g. second harmonics), can be achieved by measuring the ultrasound response under multiple excitation levels. The responses gathered from the multiple excitation levels are gain corrected in an amount corresponding to the difference in excitation levels, then subtracted. Because of this subtraction, most of the linear response will be removed, and what remains corresponds to the non-linear response.

DETAILED DESCRIPTION OF THE PREFERRED EMBODIMENTS

Figure 1:
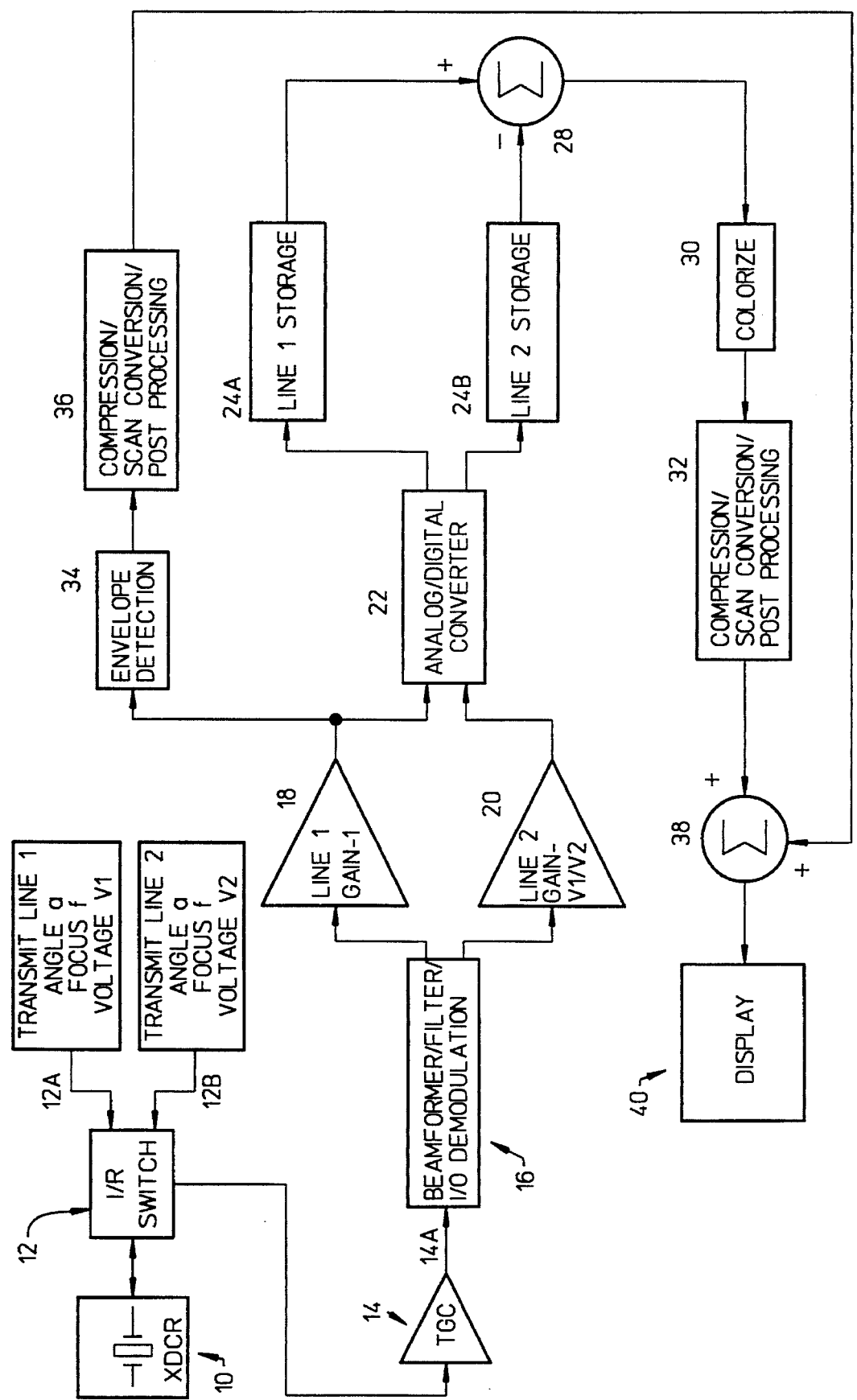
FIG. 1 illustrates the present invention.

FIG. 1 is an illustration of the present invention. A transducer 10 is connected to a transmit/receive (T/R) switch 12. The T/R switch 12 has two inputs: a transmit line 1 12A and a transmit line 2 12B. The T/R switch 12 is further connected to a total gain control (TGC) amplifier 14. The TGC amplifier 14 is connected to a first beamformer 16. The first beamformer 16 is connected to a first and a second gain amplifier 18, 20. Each gain amplifier 18, 20 is connected to an analog-to-digital converter 22 that is further connected to a line 1 storage unit 24A and a line 2 storage unit 24B. Both storage units 24A, B are connected to a first accumulator 30. A colorizer 32 is connected between an accumulator 30 and a first post-processor 34. An envelope detector 34 is connected between the first gain amplifier 18 and a second post-processor 26. An analog summer 38, connected at its inputs to the first and second post- processors 32, 36, is connected to a display 40.

The T/R switch 12 isolates the transmitter portion of the circuitry from the receiver portion. The transmitter circuitry allows for variable transmit power between transmit events (ultrasound lines), which is shown in the diagram as excitations at V1 and V2. Signals are received into the TGC amplifier 14. The output of the TGC stage goes to another gain amplifier which has variable gain between transmit lines. In the diagram, the gain for line i is 1, and the gain for line 2 is V1/V2. The output of this gain amplifier is then beamformed, filtered, and demodulated down to In-phase (I) and Quadrature (Q) baseband signals. The signal is then envelope detected and stored into memory. Storage is available for the multiple transmit events which occur at different excitation levels. In the block diagram, line 1 and gain-corrected line 2 are stored into memory and then are subtracted. This signal would be summed with one of the transmit lines, (e.g., line 1) which has also been compressed/scan-converted/post-processed. Both images would be shown simultaneously on a video display.

Figure 2:
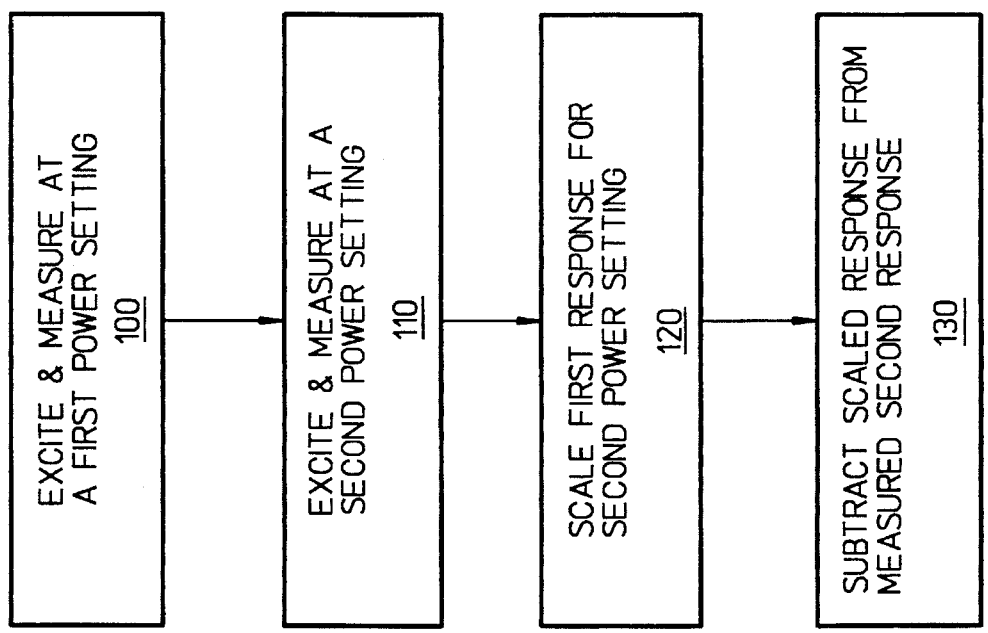
FIG. 2 is a flow diagram corresponding to FIG. 1.

FIG. 2 is a flow diagram corresponding to the block diagram shown in FIG. 1. In step 100, a first response is excited and measured at a first power setting. In step 110, a second response is excited and measured at a second power setting. In step 120, the first response is scaled for the second power setting to produce a projected response. This method relies on a straight line approximation for the projected response. In step 130, the projected response is subtracted from the second response to determine the non-linear response. If the object being insonified is linear the result would be zero.

The value of a scatter's apparent cross-section varies with transmit power, and is different for tissue and for microbubbles. For example, bubbles have been shown to exhibit a response whereby second harmonic components are generated as a function of incident pressure-squared as described by D. L. Miller in "Ultrasonic Detection of Resonant Cavitation Bubbles in a Flow Tube by their Second-Harmonic Emissions", September, 1981, Ultrasonics. Tissue also has non-linear components which are much smaller.

Achieving different power settings may occur in one of several manners. A preferred method of achieving different power settings is by varying the transmit voltage. This varies the pressure amplitude of the transmitted wave.

Alternatively, different power settings may be achieved by controlling the size of the aperture of the transducer assembly. This may be done in the lateral or elevational dimensions by using synthetic apertures. The aperture is divided into two or more groups and a transmit line is fired from each group separately. The subsequent receive information is stored. The entire aperture is then fired in the same direction and its receive echoes are stored. In this embodiment, the step scaling includes beamforming the response from the two smaller apertures and subtracting this from the entire aperture to determine the non-linear response.

Another way of controlling transmit output is to fire a subset of elements in the array and compare the scaled subset response to the response of the entire array. This has to be done in such a way as to minimize grating lobes that stem from undersampling of the aperture and steering errors that come from asymmetries about the center of the aperture.

Although the invention has been illustrated using two excitation levels, one of ordinary skill in the art can extend the concept by applying N excitation levels, where $N \geq 2$, and subtracting linear combinations of the corresponding N responses, each linear combination representing the projected response. The coefficients of the linear combination are chosen so that the subtraction eliminates the linear portion of the response, leaving only the non-linear response.

We claim:

1. A method for measuring a non-linear response of tissue and bubbles comprising the steps of:

exciting and measuring a first response at a first power setting;

exciting and measuring a second response at a second power setting, wherein the second power setting is different than the first power setting;

scaling the first response for the second power setting to produce a projected response; and subtracting the projected response from the second response to determine the non-linear response.

2. A method, as defined in claim 1, wherein the first and second power settings are voltage levels.

3. A method, as defined in claim 2, wherein the first power setting is half the second power setting.

4. A method, as defined in claim 2, wherein the first power setting is half the second power setting.

5. A method, as defined in claim 1, wherein the step of exciting and measuring a first response includes the step of selecting the first power setting by reducing the aperture such that some of the transducer assembly is active.

6. A method, as defined in claim 5, wherein the step of reducing the aperture includes symmetrically firing a subset of elements of the transducer assembly.

7. A method, as defined in claim 5, wherein:

the step of reducing the aperture further includes,
partitioning the transducer assembly into two groups using a synthetic aperture, and
firing a line from each of the two groups; the step of exciting and measuring the second response further includes, firing the whole aperture in the same line, and the step of scaling includes grouping the response from the two groups and comparing the grouped response with the second response to determine the non-linearity of the bubbles and the tissue.

8. A method for measuring a non-linear response of tissue and bubbles comprising the steps of:

exciting and measuring responses at each one of a group of power levels, wherein the group has at least two different power levels;

scaling each response according to its power setting to produce a projected response; and subtracting linear combinations of the projected responses to determine the non-linear response.

9. A method, as defined in claim 8, wherein the different power levels of the power group are voltage levels.

10. A method, as defined in claim 8, wherein the step of exciting and measuring each response includes the step of selecting one of the power group by reducing the aperture such that some of the transducer assembly is active.

11. A method, as defined in claim 10, wherein the step of reducing the aperture includes symmetrically firing a subset of elements of the transducer assembly.

12. A method, as defined in claim 10, wherein:

the step of reducing the aperture further includes,
partitioning the transducer assembly into two groups using a synthetic aperture, and
firing a line from each of the two groups;

the step of exciting and measuring the second response further includes, firing the whole aperture in the same line, and the step of scaling includes grouping the response from the two groups and comparing the grouped response with the second response to determine the non-linearity of the bubbles and the tissue.

* * * * *